United States Patent
Chang et al.

(10) Patent No.: US 11,547,105 B1
(45) Date of Patent: Jan. 10, 2023

(54) SPINNING FISHING REEL

(71) Applicant: OKUMA FISHING TACKLE CO., LTD., Taichung (TW)

(72) Inventors: Liang-Jen Chang, Taichung (TW); Ching-Po Liao, Taichung (TW)

(73) Assignee: OKUMA FISHING TACKLE CO. LTD., Taichung (TW)

(*) Notice: Subject to any disclaimer, the term of this patent is extended or adjusted under 35 U.S.C. 154(b) by 0 days.

(21) Appl. No.: 17/355,283

(22) Filed: Jun. 23, 2021

(51) Int. Cl.
*A01K 89/01* (2006.01)
*A01K 89/015* (2006.01)
*A01K 89/00* (2006.01)

(52) U.S. Cl.
CPC ........ *A01K 89/0183* (2015.05); *A01K 89/006* (2013.01); *A01K 89/0193* (2015.05)

(58) Field of Classification Search
CPC .............. A01K 89/004; A01K 89/006; A01K 89/01126; A01K 89/0186; A01K 89/01916
See application file for complete search history.

(56) References Cited

U.S. PATENT DOCUMENTS

| | | | | |
|---|---|---|---|---|
| 4,196,867 | A * | 4/1980 | Miller | A01K 89/01 464/33 |
| 2006/0071107 | A1 * | 4/2006 | Ochiai | A01K 89/006 242/282 |
| 2018/0055025 | A1 * | 3/2018 | da Rosa | A01K 89/004 |
| 2018/0098530 | A1 * | 4/2018 | Ikebukuro | A01K 89/006 |

FOREIGN PATENT DOCUMENTS

| | | | | |
|---|---|---|---|---|
| CN | 101843231 | A * | 9/2010 | ........... A01K 89/004 |
| DE | 102018125975 | A1 * | 4/2019 | ........... A01K 89/006 |
| EP | 2232987 | A1 * | 9/2010 | ........... A01K 89/004 |

* cited by examiner

*Primary Examiner* — Emmanuel M Marcelo
(74) *Attorney, Agent, or Firm* — Muncy, Geissler, Olds & Lowe, P.C.

(57) ABSTRACT

A spinning fishing reel includes a housing, a line spool reciprocatingly moveable relative to the housing, a rotor rotatable relative to the line spool, a gear disc rotatably mounted inside the housing, and a handle assembly. The gear disc includes a shaft tube, and an internal thread portion and a stop portion both provided at an inner wall of the shaft tube. The handle assembly includes a handle and a drive shaft having a first end pivotally connected with the handle. The drive shaft has an external thread portion engaged with the internal thread portion of the gear disc in a way that the drive shaft is penetrated through an opening of the housing and inserted into the shaft tube of the gear disc, and a second end of the drive shaft is abutted against the stop portion of the gear disc.

6 Claims, 4 Drawing Sheets

SPINNING FISHING REEL

BACKGROUND OF THE INVENTION

1. Field of the Invention

The present invention relates generally to a fishing tackle and more particularly, to a spinning fishing reel.

2. Description of the Related Art

A conventional spinning fishing reel is composed of a gear disc rotatably mounted inside a housing of the fishing reel, and a handle detachably fixed to the gear disc. To snarl the fishing line, the user turns the handle, such that the rotary force will be transmitted through the gear disc to a rotor and a line spool, thereby facilitating the fishing line to be evenly wound around the line spool. The aforesaid handle has a drive shaft screwingly threaded into a shaft tube of the gear disc. To ensure that the handle can be firmly and fixedly coupled to the gear disc, the user will tighten up the handle as much as possible. However, the material, such as zinc, which is conventionally used to make the gear disc, has insufficient structural strength, resulting in that the end portion of the shaft tube of the gear disc will tend to be expanded and deformed due to the grounds that the aforesaid end portion is excessively compressed by a shaft sleeve that is sleeved onto the drive shaft. In this case, the expansion and deformation of the end portion of the shaft tube will cause a phenomenon of jam between the gear disc and an external element, such as a bearing, outside the gear disc. As a result, it will be very difficult for the user to dismantle and remove the bearing from the gear disc when the user would like to fix the jammed fishing reel. Further, the deformation of the bearing will adversely affect the smoothness of winding the fishing line. If the gear disc is made by stainless steel to enhance its structural strength, the manufacturing cost will substantially increase.

SUMMARY OF THE INVENTION

The present invention has been accomplished in view of the above-noted circumstances. It is an objective of the present invention to provide a spinning fishing reel, which has a handle that can be positively and firmly threaded with a gear disc, can avoid the gear disc from deformation due to excessive compression, and will not dramatically increase the manufacturing cost.

To attain the above objective, the present invention provides a spinning fishing reel, which comprises a housing, a line spool, a rotor, a gear disc, and a handle assembly. The housing includes an internal accommodation and an opening in communication with the internal accommodation. The line spool is located in front of the housing and configured as being reciprocatingly moveable relative to the housing along an axis of the housing. The rotor is located between the housing and the line spool and rotatable relative to the line spool. The gear disc is rotatably mounted in the internal accommodation of the housing and includes a shaft tube, an internal thread portion at an inner wall of the shaft tube, and a stop portion at the inner wall of the shaft tube. The handle assembly includes a handle, a drive shaft having a first end pivotally connected with the handle and a second end opposite to the first end, and a shaft sleeve sleeved onto the drive shaft and abutted between the handle and the shaft tube of the gear disc. The drive shaft is provided at an outer periphery thereof with an external thread portion screwingly threaded into the internal thread portion of the gear disc in a way that the drive shaft is penetrated through the opening of the housing and inserted into the shaft tube of the gear disc, and the second end of the drive shaft is abutted against the stop portion of the gear disc.

With the above-mentioned structural features, the gear disc can provide a predetermined thread-fastening depth to the drive shaft, such that the handle assembly can be firmly coupled to the gear disc. This also avoids the end portion of the shaft tube of the gear disc from being excessively compressed by the shaft sleeve outside the drive shaft so as to prevent the end portion from expansion and deformation. As a result, the gear disc will not be jammed against an element (such as bearing) outside the gear disc, the gear disc can be smoothly dismantled and removed when it is needed to be maintained, and the task of winding fishing line can be operated smoothly because there will be no deformed shaft tube to affect the bearing. Further, the gear disc needs not to be made by a material having a high structural strength, thereby lowering the manufacturing cost.

BRIEF DESCRIPTION OF THE DRAWINGS

The present invention will become more fully understood from the detailed description given herein below and the accompanying drawings which are given by way of illustration only, and thus are not limitative of the present invention, and wherein.

DETAILED DESCRIPTION OF THE INVENTION

Figure 1:
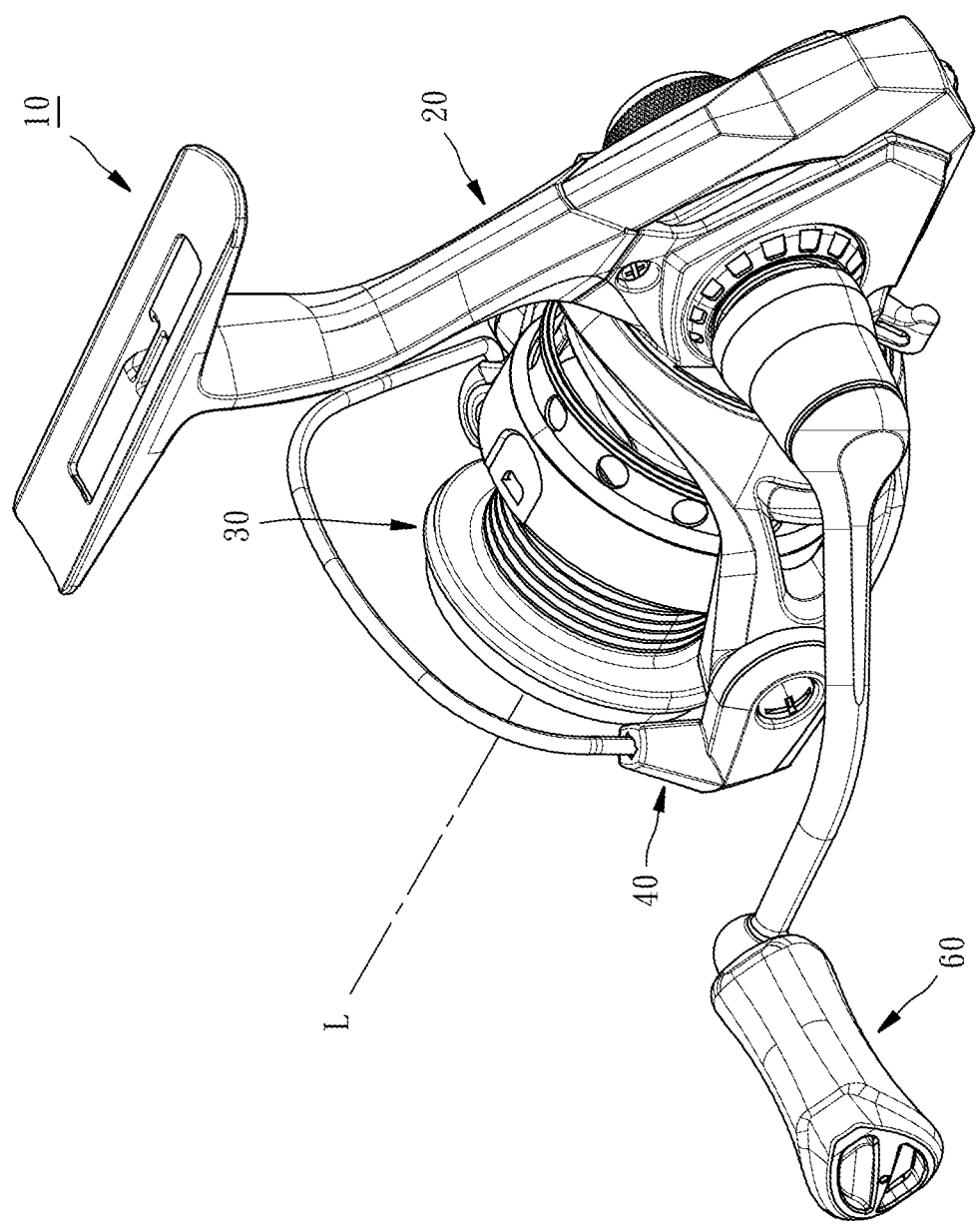
FIG. 1 is a perspective view of a spinning fishing reel according to an embodiment of the present invention.
Figure 2:
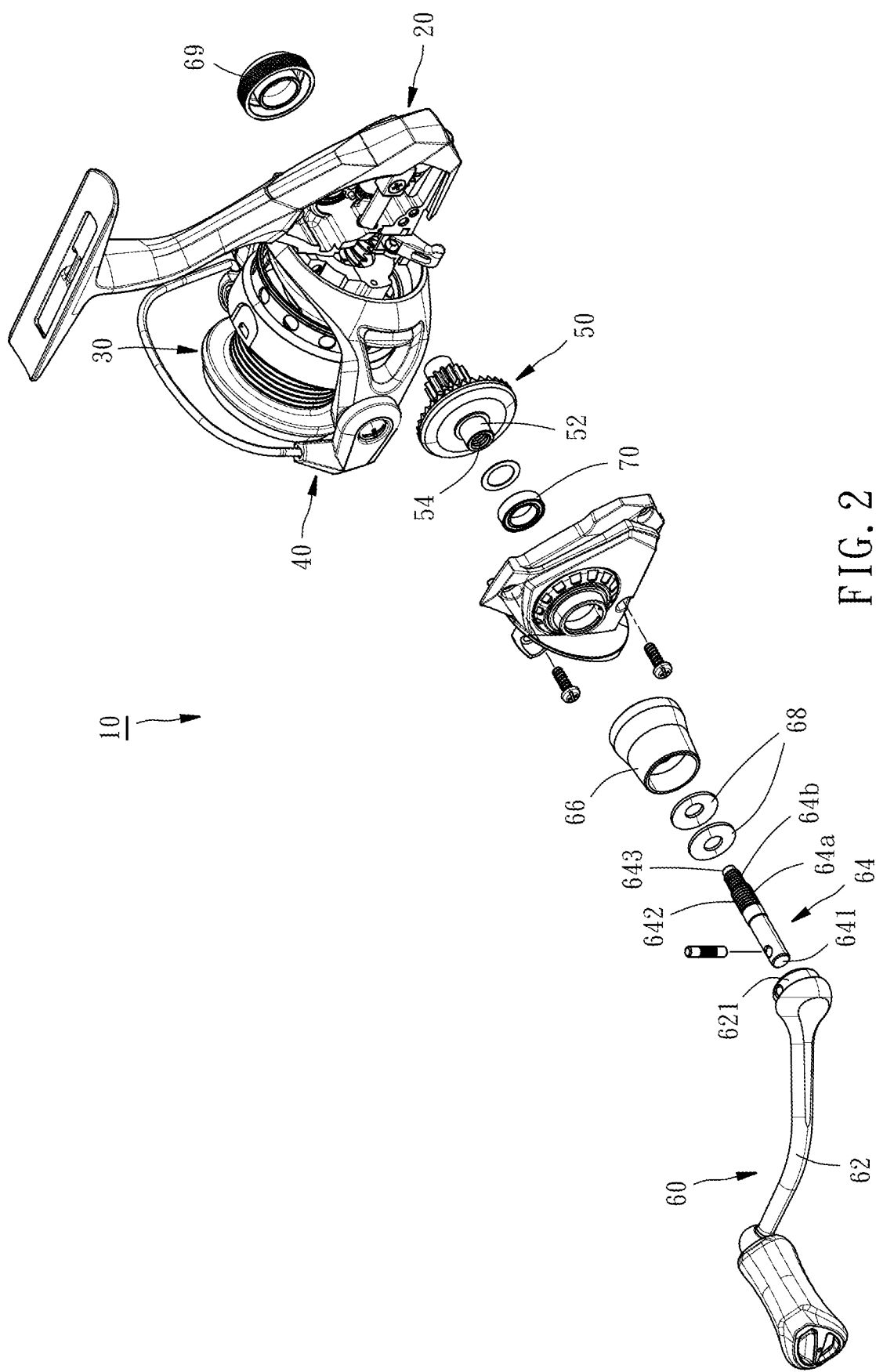
FIG. 2 is an exploded perspective view of the spinning fishing reel of the embodiment of the present invention.
Figure 3:
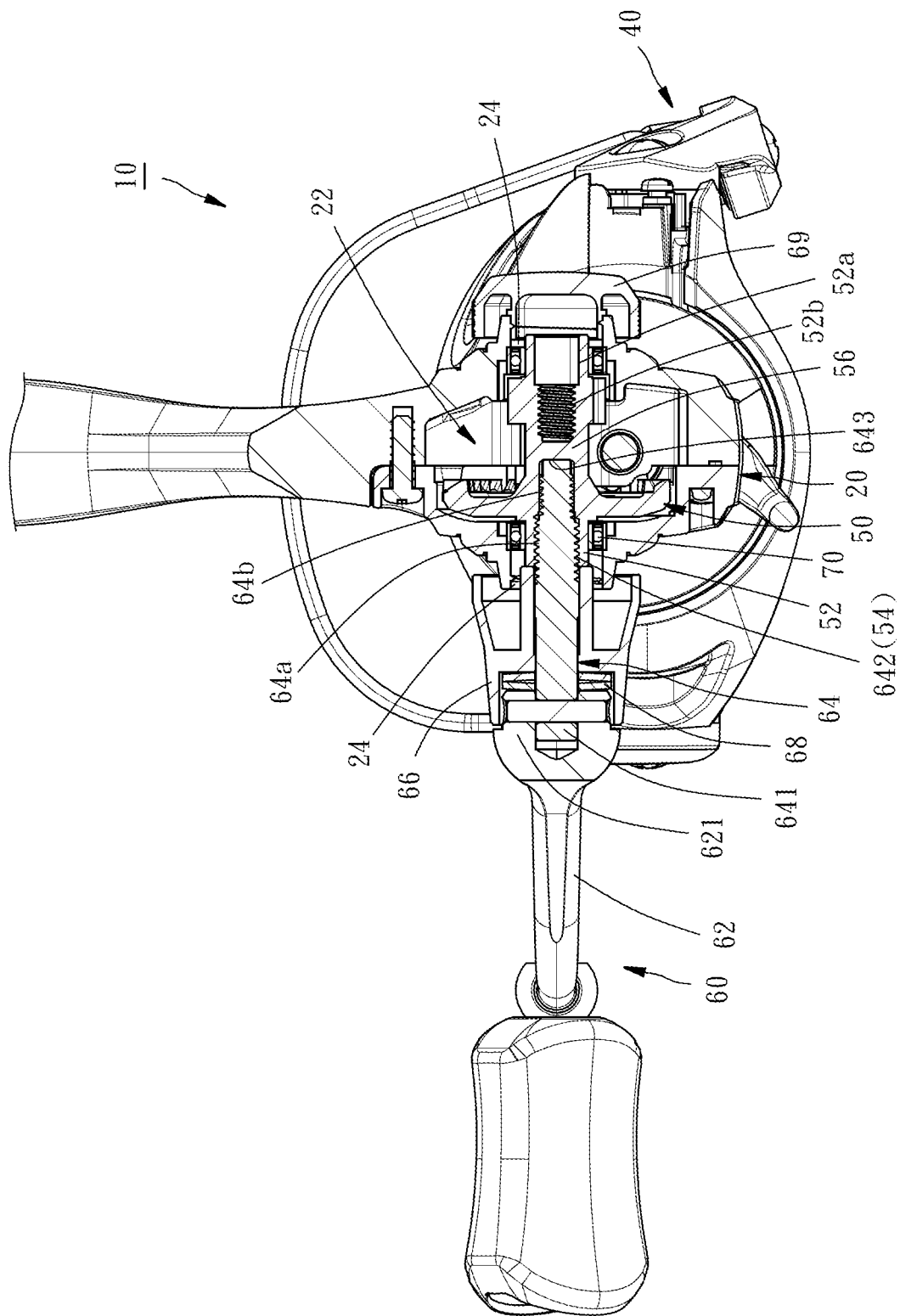
FIG. 3 is a partially sectional view of the spinning fishing reel of the embodiment of the present invention.

Hereunder a preferred embodiment will be detailedly described with accompanying drawings for illustrating technical features and structure of the present invention. As shown in FIGS. 1-3, a spinning fishing reel 10 provided by an embodiment of the present invention is composed of a housing 20, a line spool 30, a rotor 40, a gear disc 50, and a handle assembly 60.

The housing 20 includes an internal accommodation 22 and two openings 24 in communication with the internal accommodation 22 and ambient environment. The housing 20 is used to couple a fishing rod (not shown). The two openings 24, namely the left opening and the right opening, are provided at left and right sides of the housing 20, respectively.

The line spool 30 is located in front of the housing 20 and configured in a way that the line spool 30 is reciprocatingly moveable relative to the housing 20 along an axis L of the housing 20.

The rotor 40 is located between the housing 20 and the line spool 30 and rotatable relative to the line spool 30 and the housing 20.

Figure 4:
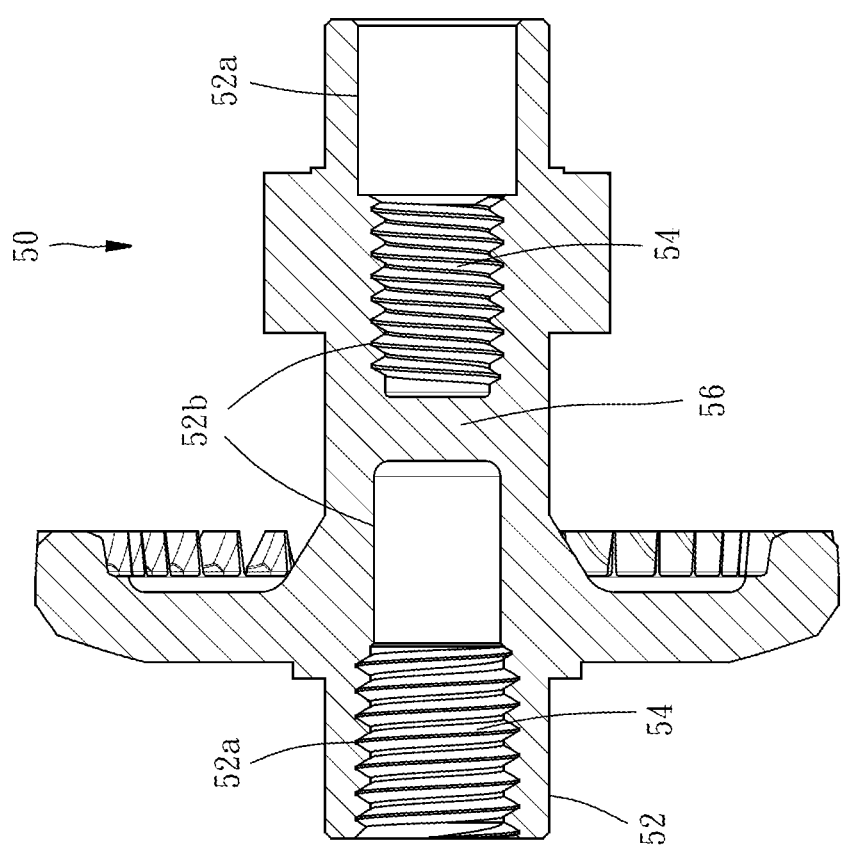
FIG. 4 is a sectional view of a gear disc of the spinning fishing reel of the embodiment of the present invention.

Referring to FIGS. 3 and 4, the gear disc 50 is rotatably mounted in the internal accommodation 22 of the housing 20. The gear disc 50 includes a shaft tube 52, two internal thread portions 54 provided at an inner wall of the shaft tube 52, and a stop portion 56 provided at the inner wall of the shaft tube 52. In this embodiment, the stop portion 56 is realized as a partition plate dividing an inside of the shaft tube 52 into two parts, namely the left part and the right part, as shown in FIG. 4. The two lateral sides of the stop portion (partition plate) 56 may be flat surface, cone surfaces, or surfaces with other shapes. The partition plate 56 may be provided with one or more through holes. The stop portion 56 is monolithically formed with the shaft tube 52. At the inner wall of the shaft tube 52 and by the left and right lateral sides of the stop portion 56, two big-diameter sections 52a and two small-diameter sections 52b are provided in a way that each small-diameter section 52b is located between one of the big-diameter sections 52a and the stop portion 56. One of the two internal thread portions 54 is provided at the left big-diameter section 52a, and the other is provided at the right small-diameter section 52b.

Referring to FIGS. 2 and 3, the handle assembly 60 is composed of a handle 62, a drive shaft 64 having a first end 641 pivotally connected with the handle 62 and a second end 643 opposite to the first end 641, a shaft sleeve 66 sleeved onto the drive shaft 64 and abutted between a distal end 621 of the handle 62 and the shaft tube 52 of the gear disc 50, and two spring washers 68 disposed between the shaft sleeve 66 and the distal end 621 of the handle 62. The drive shaft 64 is provided at an outer periphery thereof with an external thread portion 642 adapted for being screwingly threaded into the internal thread portion 54 at the left part of the shaft tube 52 of the gear disc 50. The drive shaft 64 is penetrated through the left opening 24 of the housing 20 and inserted into the shaft tube 52 of the gear disc 50 in a way that the second end 643 of the drive shaft 64 is abutted against, i.e., in contact with, the stop portion 56 of the gear disc 50. The second end 643 may have a shape complementary to that of the partition plate 56 to ensure a stable coupling therebetween. The right opening 24 of the housing 20 is covered by a handle cap 69. The drive shaft 64 is provided with a big-diameter portion 64a located in the left big-diameter section 52a of the shaft tube 52, and a small-diameter portion 64b located in the left small-diameter section 52b of the shaft tube 52.

In this embodiment, the external thread portion 642 of the drive shaft 64 is provided at the big-diameter portion 64a and the small-diameter portion 64b, and the small-diameter section 52b at the left side of the stop portion 56 and the big-diameter portion 52a at the right side of the stop portion 56 have a smooth inner wall without thread.

To mount the handle assembly 60 to the gear disc 50, the drive shaft 64 of the handle assembly 60 is inserted into the shaft tube 52 of the gear disc 50 in a way that the external thread portion 642 at the big-diameter portion 64a of the drive shaft 64 is screwingly threaded with the left internal thread portion 54 of the shaft tube 52 until the second end 643 of the drive shaft 64 contacts and stops at the stop portion 56 of the gear disc 50, i.e., the drive shaft 64 cannot be continuously turned. At this moment, the shaft sleeve 66 is just firmly abutted between the distal end 621 of the handle 62 and the shaft tube 52. As a result, the gear disc 50 provides a predetermined thread-fastening depth to the drive shaft 64, such that the handle assembly 60 can be positively and firmly coupled to the gear disc 50. This structural design also avoids the end portion of the shaft tube 52 of the gear disc 50 from being excessively compressed by the shaft sleeve 66 so as to prevent the end portion from expansion and deformation. In this way, the gear disc 50 will not be jammed against an element (such as bearing 70) outside the gear disc 50, the gear disc 50 or the bearing 70 can be smoothly dismantled and removed when it is needed to be replaced or maintained, and the task of winding fishing line can be operated smoothly because the bearing 70 will not be pressed by the shaft tube 52. Further, the gear disc 50 needs not to be made by a material having high rigidity, thereby lowering the manufacturing cost. After the handle assembly 60 and the gear disc 50 are firmly coupled with each other, the user can turn the handle assembly 60 to enable the rotary force to be transmitted through the gear disc 50 to the rotor 40 and the line spool 30. In this way, the fishing line can be evenly wound around the line spool 30, i.e., the task of winding the fishing line can be smoothly operated.

To compensate the manufacturing dimension tolerances of various elements of the spinning fishing reel 10, the two spring washers 68 are disposed between the handle 62 and the shaft sleeve 66 so as to ensure that a gap, which may cause a looseness of the sleeve 66 or even a bumping of the sleeve 66 with another element, will not exist between the distal end 621 of the handle 62 and the shaft sleeve 66. The rebounding ability of the two spring washers 68 can compensate the gap having various width. If the manufacturing and assembly works can be done precisely and accurately to diminish or eliminate the gap, the two spring washers 68 can be omitted. In another feasible embodiment, one or more spring washers 68 may be provided in accordance with actual need.

Based on the technical features of the present invention, various modifications to the spinning fishing reel 10 may be made. For example, the stop portion 56 may be configured as not being monolithically formed with the shaft tube 52, but being made as an individual element mounted inside the shaft tube 52. The stop portion 56 may not be realized as a partition plate, but an annular element extending from the inner wall of the shaft tube 52 as long as it can be stopped by the drive shaft 64. The advantage of providing the big-diameter section 52a and the small-diameter section 52b at each of the left and right sides of the stop portion 56 lies in that the handle assembly 60 can be coupled to the gear disc 50 via the left opening 24 of the housing 20, as being illustrated in the above-mentioned embodiment, if the user is a left-hander, and if the user is however a right-hander, the user can remove the handle cap 69 at the right side of the housing 20 first, then couple the handle assembly 60 to the gear disc 50 via the right opening 24 of the housing 20 by engagement of the external thread portion 642 at the small-diameter portion 64b of the drive shaft 64 with the internal thread portion 54 at the right side of the stop portion 56, and finally cover the left opening 24 of the housing 20 by the handle cap 69. In another embodiment, the big-diameter section 52a and the small-diameter section 52b may be provided at one of the left and right sides of the stop portion 56 only. Alternately, the internal thread portion 54 may be provided at the small-diameter section 52b that is located at the left side of the stop portion 56 and also at the big-diameter section 52a that is located at the right side of the stop portion 56. In any event, when the internal thread portion 54 is provided at the big-diameter section 52a, the external thread portion 642 must be correspondingly provided at the big-diameter portion 64a of the drive shaft 64. Similarly, when the internal thread portion 54 is provided at the small-diameter section 52b, the external thread portion 642 must be correspondingly provided at the small-diameter portion 64b of the drive shaft 64. Such variations are not to be regarded as a departure from the spirit and scope of the invention, and all such modifications as would be obvious to one skilled in the art are intended to be included within the scope of the following claims.

What is claimed is:

1. A spinning fishing reel, comprising:
a housing having an internal accommodation and an opening in communication with the internal accommodation;
a line spool located in front of the housing and configured as being reciprocatingly moveable relative to the housing along an axis of the housing;
a rotor located between the housing and the line spool and rotatable relative to the line spool;
a gear disc rotatably mounted in the internal accommodation of the housing and having a shaft tube, an internal thread portion at an inner wall of the shaft tube, and a stop portion at the inner wall of the shaft tube;
a handle assembly comprising a handle, a drive shaft having a first end pivotally connected with the handle and a second end opposite to the first end, and a shaft sleeve sleeved onto the drive shaft and abutted between the handle and the shaft tube of the gear disc; wherein the drive shaft is provided at an outer periphery thereof with an external thread portion screwingly threaded into the internal thread portion of the gear disc in a way that the drive shaft is penetrated through the opening of the housing and inserted into the shaft tube of the gear disc, and the second end of the drive shaft is abutted against the stop portion of the gear disc;
wherein the handle assembly comprises at least one spring washer disposed between the shaft sleeve and the handle.

2. The spinning fishing reel as claimed in claim 1, wherein the stop portion of the gear disc is formed by a partition plate dividing an inside of the shaft tube into two parts.

3. The spinning fishing reel as claimed in claim 1, wherein the stop portion of the gear disc is monolithically formed with the shaft tube.

4. The spinning fishing reel as claimed in claim 3, wherein the inner wall of the shaft tube of the gear disc is provided with a big-diameter section and a small-diameter section between the big-diameter section and the stop portion; the drive shaft is provided with a big-diameter portion located in the big-diameter section of the shaft tube, and a small-diameter portion located in the small-diameter section of the shaft tube.

5. The spinning fishing reel as claimed in claim 4, wherein the internal thread portion is provided at the big-diameter section of the shaft tube, and the external thread portion is provided at the big-diameter portion of the drive shaft.

6. The spinning fishing reel as claimed in claim 4, wherein the internal thread portion is provided at the small-diameter section of the shaft tube and the external thread portion is provided at the small-diameter portion of the drive shaft.

* * * * *